Oct. 16, 1923.　　　　　C. E. BARNHART　　　　　1,471,231
AUTOMATIC AIR COUPLER
Filed Aug. 18, 1921　　　　2 Sheets-Sheet 1

Inventor
C. E. Barnhart
By H. B. Willson & Co.
Attorneys

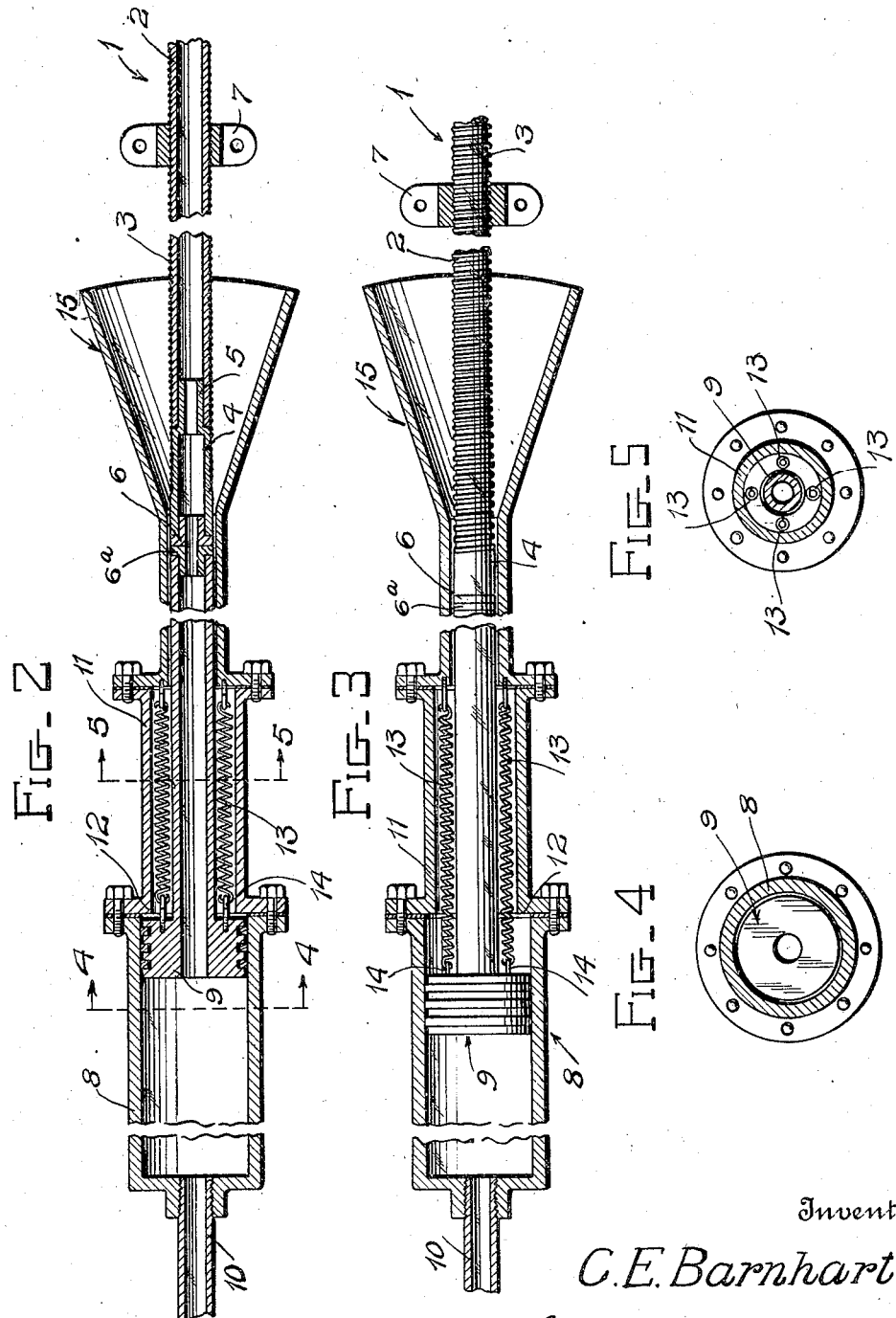

Patented Oct. 16, 1923.

1,471,231

UNITED STATES PATENT OFFICE.

CURTIS E. BARNHART, OF AUBURN, NEBRASKA.

AUTOMATIC AIR COUPLER.

Application filed August 18, 1921. Serial No. 493,304.

*To all whom it may concern:*

Be it known that I, CURTIS E. BARNHART, a citizen of the United States, residing at Auburn, in the county of Nemaha and State of Nebraska, have invented certain new and useful Improvements in Automatic Air Couplers; and I do declare the following to be a full, clear, and exact description of the invention, such as will enable others skilled in the art to which it appertains to make and use the same.

This invention relates to an improved device for automatically coupling the air or steam line between cars, and it has for its principal object to provide a device which is absolutely leak proof and which is such that liability of breakage of any of the parts during the coupling operation is practically eliminated.

Another object of the invention is to generally improve upon couplers of this class by the provision of one of extreme simplicity and durability wherein one of the conduits which extends from one car is made flexible to accommodate relative movements between the cars and to prevent breakage of this conduit when the cars become angled when turning curves in the track.

A further object of the invention is to provide an automatic fluid line coupling which includes a cylinder in which a piston is slidable, the same being moved by the fluid pressure which is exerted against it, and carrying on its outer end a gasket which is forced into tight engagement with the corresponding element on the fluid line with which it co-acts on the other car, thus providing a fluid tight joint.

A still further object of the invention is to provide a coupling of the type under consideration which embodies the aforesaid coupling, together with coiled springs for assisting in bringing about a leak-proof joint, these springs having the additional function of maintaining the piston normally at one end of the cylinder when the cars are uncoupled, thus preventing undue movement and rattling.

Other objects and advantages of the invention will be apparent during the course of the following description.

In the accompanying drawings forming a part of this specification and in which like numerals are employed to designate like parts throughout the same:

Figure 2 is a central longitudinal sectional view through one of the couplers showing the parts in the act of being coupled.

Figure 3 is a view similar to Fig. 2 showing the position the parts assume after they are coupled.

Figures 4 and 5 are sectional views taken substantially on the planes of the lines 4—4 and 5—5 respectively of Fig. 2.

Broadly speaking, the invention comprises male and female members which are anchored on the air or steam pipes on the car, said members extending beyond the ends of the car and being positioned in alignment with one another so that when the cars come together and are coupled, the air lines from the separate cars will automatically couple when said members are engaged with one another. As will be seen from considering the following description, one of said members embodies a flexible conduit with a gasket at its free end, while the remaining member, which is likewise in the form of a conduit, includes a flared entrance to guide the male member into engagement with the female member, this last named member embodying a pressure-actuated piston carrying a gasket which is engageable with the first named gasket, so that when the coupling is effected, an absolutely leak-proof joint is had.

Figure 1:
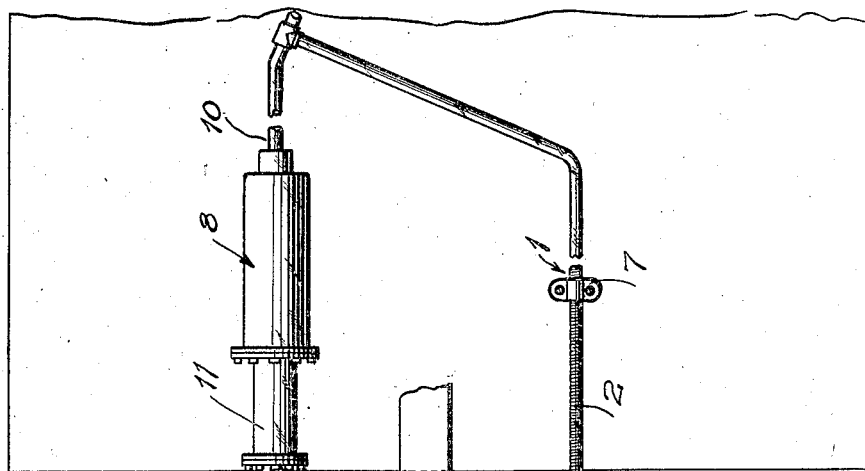
Figure 1 is a bottom plan view of the end of two cars equipped with my improved airline coupling.
Figure 1:
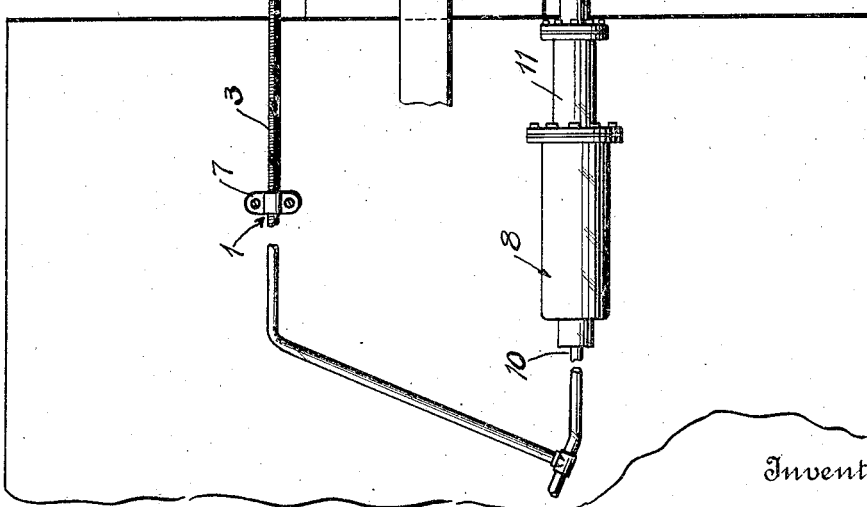

Referring to the drawings by numerals, 1 designates generally the male conduit referred to above and this one being carried by one car and in its preferred form comprising a hose 2 surrounded by a coiled spring 3, thus providing a flexible conduit which will accommodate the relative movements of the cars without causing any breakage. Before proceeding, I wish to state that, as is usual, there will be two of these improved couplers used on each car as shown in Figure 1 of the drawings. However, since each coupling is a duplicate of the other, the description from now on will be in the singular, it being understood that wherever such terms occur, they indicate all like parts. Proceeding, it is to be said that the part 1 includes a short pipe section 4 having a reduced neck 5 extending into the aforesaid hose 2, the main portion of this pipe 4 being surrounded by the aforesaid coiled spring 3 as clearly shown in Fig. 2. This pipe 4 is equipped at its extremity with a suitable gasket 6. It may be stated here that suitable brackets 7 will be employed for connecting the various parts to the bottom of the car bodies as shown and these brackets will be constructed to accommodate the parts of the coupling with which they are connected. It is understood that the flexible conduit is connected in any suitable way with the end of the air or steam pipe on the car on which this conduit is arranged. Referring now to the remaining part of the device, which has been before generally indicated as the female member, it is to be pointed out that this part in its preferred form includes a cylinder 8 in which a piston 9 is slidably arranged. This cylinder is constructed to permit the steam pipe or air pipe 10 to be connected therewith as shown in the drawings and is equipped with a flange at its opposite end to which the flanged guide part 11 is bolted or otherwise detachably connected. It is to be noted that the part 11 is of less diameter than the cylinder 8 and at the point of connection of these two parts a shoulder 12 is formed and the head of the piston 9 engages this shoulder so that the movement of the piston in one direction is limited. Both the head and rod of the piston are formed with a bore so that the fluid is permitted to pass therethrough. At the end of the piston rod is another gasket 6ª which engages the first named gasket and after the coupling is effected, these gaskets bear sufficiently tight against one another to form a leak-proof joint. To assure such a joint, I employ a plurality of coiled springs 13 and connect these at one end with a suitable part of the device, while I connect them at the opposite ends with hooks 14 carried by the piston head. It is obvious that when the part 1 is engaged with the free end of the piston rod and the cars are brought closer together so as to engage the coupling heads of the main coupler, the piston will be moved longitudinally and the springs 13 placed under tension so that the parts will assume a position somewhat like that indicated in Fig. 3. Hence, the tendency of the springs to resist said movement together with the action of the fluid pressure on the piston will cause the gaskets 6 and 6ª to bear tightly against one another and thus provide the desired liquid-proof joint. To facilitate engagement of the members of the coupling with one another, I equip the female member with a conical or flared guide 15.

In operation, it will be seen that the improved fluid line coupling members will be rendered effective automatically as the cars approach one another and the coupler heads thereon are engaged for connecting the cars together. When such coupling is being effected, the male flexible conduit 1 which is carried by one of the cars, will enter the conical guide 15 and the gasket on the free end thereof will become engaged with the gasket on the end of the hollow piston rod. A sliding movement will then be imparted to the piston and the springs 13 will become elongated and placed under tension and the above results obtained.

From the foregoing description, it will be seen that I have perfected an extremely desirable coupling for fluid lines on railway cars. The construction and arrangement is such that strength and durability is insured and effectiveness of operation is likewise insured. The parts are such that they can be easily separated in making repairs and will accommodate various angling of the cars when making turns or curves in the track. The foregoing and other features of the invention, have no doubt been made apparent from the foregoing description, as is likewise a clear understanding of the invention. Therefore, a more lengthy and detailed description is thought unnecessary.

Since probably the best results may be obtained with the construction and arrangement herein shown and described, this is taken as the preferred embodiment of the invention. However, I wish it to be understood that minor changes coming within the scope of the subjoined claims may be resorted to if desired.

I claim:

1. A coupler of the class described comprising a flexible conduit having a gasket at its outer end, a second conduit for co-operation with the first named conduit, including a cylinder connected to a fluid pipe, a piston slidable in said cylinder, the head and rod thereof being formed with a bore to permit passage of the fluid therethrough, means closing one end of the cylinder for limiting the sliding movement of the piston in one direction, a conical guide, coiled springs connected with said guide adjacent said piston for resisting the sliding movement of the latter, and a gasket carried by the piston rod for co-action with said first named gasket.

2. A structure of the character described comprising a conduit having a gasket at its outer end, a second conduit, a cylinder connected with the second conduit, said cylinder having a reduced portion providing an abutment shoulder and having a flaring inlet, a hollow piston in said cylinder limited in its sliding movement in one direction by said shoulder and having a hollow rod extension extending through the reduced portion of said cylinder into said inlet and provided at its outer end with a gasket for engagement by the gasket of the first mentioned conduit, and springs in the reduced portion of said cylinder connected with said piston to yieldably hold said piston against movement away from said shoulder.

3. A structure of the character described comprising a conduit provided with a gasket at its outer end, a second conduit, a cylinder carried by the second conduit and having a reduced portion terminating in a flaring inlet, a hollow piston in said cylinder having a hollow rod extension extending through the reduced portion of the cylinder and provided at its outer end with a gasket for engagement by the gasket of the first mentioned conduit, and spring means having engagement with said piston to yieldably hold the same against sliding in the cylinder in one direction.

In testimony whereof I have hereunto set my hand.

CURTIS E. BARNHART.